US004001791B2

United States Statutory Invention Registration [19]

[11] Reg. Number: H1791

Williams

[45] Published: Mar. 2, 1999

[54] STIMULATED BRILLOUIN SCATTERING FOR FIBER-OPTIC LINKS

[76] Inventor: Keith J. Williams, 827 Chatsworth Dr., Accokeek, Md. 20607

[21] Appl. No.: 741,005

[22] Filed: Oct. 31, 1996

[51] Int. Cl.[6] ..... G02B 6/00

[52] U.S. Cl. ..... 385/140; 385/27; 385/39; 372/3; 372/21; 372/69; 372/106; 359/156; 359/181; 359/182; 359/183; 359/327; 359/334

[58] Field of Search ..... 385/140, 27, 39; 372/3, 21, 69, 106; 359/156, 181, 182, 183, 327, 334

[56] References Cited

U.S. PATENT DOCUMENTS 4,560,246 12/1985 Cotter ..... 385/27 X

OTHER PUBLICATIONS

K.J. Williams et al., Stimulated Brillouin Scattering for Improvement of Microwave Fiber–Optic Link Efficiency, Electronics Letters, 30, 1965, (No. 23, Nov. 10, 1994).

*Primary Examiner*—Daniel T. Pihulic

[57] ABSTRACT

An attenuator/filter is disclosed that is inherently tuned and provides for a stimulated Brillouin scattering effect having a predetermined threshold that fixes the output thereof at a predefined power level. The stimulated Brillouin scattering effect is disclosed as being provided by either a fused silica optical fiber or a fiber-optic ring resonator both of which act as a filter to allow selected frequencies to pass. The SBS threshold is selected to improve the sideband to carrier power ratio which, in turn, determines the modulation depth for the modulated signal.

13 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

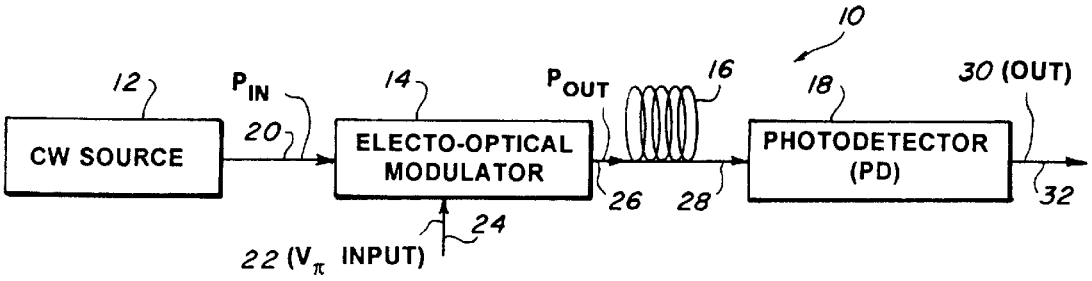
(PRIOR ART)
FIG. 1
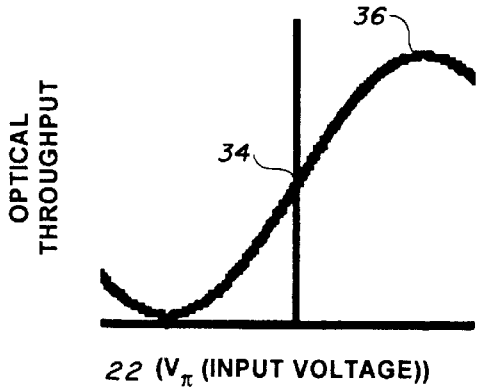
(PRIOR ART)
FIG. 2
(PRIOR ART)
FIG. 3
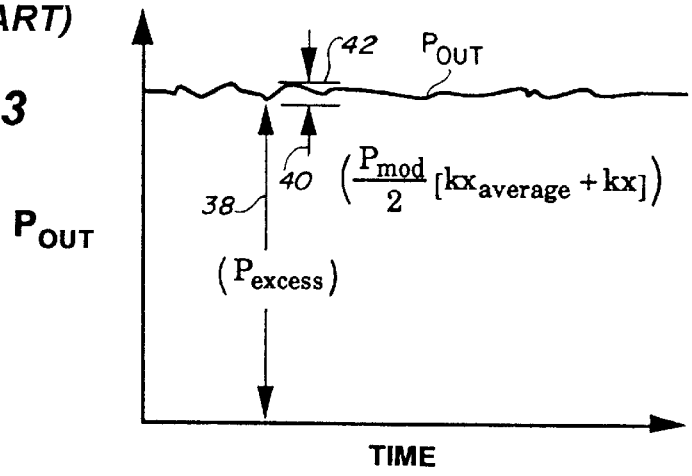

STIMULATED BRILLOUIN SCATTERING FOR FIBER-OPTIC LINKS

BACKGROUND OF THE INVENTION

1. Field of the Invention

The present invention relates to sensing, transmitting and processing of electrical signals carried by an optical carrier wave. More particularly, the present invention relates to modulating optical carriers, having sidebands, with relatively weak signals, and improving the power ratio of the sidebands relative to their carrier wave by the use of a Brillouin medium.

2. Description of the Prior Art

The processing systems that utilize fiber optics and electro-optical modulators to modulate information carried by optical carrier waves and their sidebands are of ever increasing importance. The modulation efficiency of electro-optical modulators has a direct impact on the efficiency of the optical processing systems. One of the contributing factors that degrades the modulation efficiency is that most modulators exhibit large switching (on-off) voltages and so small input signals have little effect on the optical carrier transmitted from the electro-optical modulator. The modulator output commonly consists of a strong unmodulated optical carrier with relatively weak signal sidebands.

The strong unmodulated optical carrier is further typically and undesirably strengthened because it is desired to have high optical power levels in order to create relatively high signal-to-noise ratios of the signals being carried by the optical carrier. However, these strong unmodulated optical signals that correspond to weakly modulated optical waves (having small modulation indices, commonly referred to as a depth of modulation) leave significant unmodulated signal power in the original carrier. Hence, despite a high average optical power needed to increase the electrical signal power for desired signal-to-noise ratios, the electrical power carried by the modulated signals may be quite small. The unmodulated signal, that is, excess optical power not being utilized for modulation purposes is detrimental in at least two ways. First, optical amplifiers are limited by both their average input and output powers; therefore, optical amplifiers will have limited use to boost the weakly modulated optical wave contained in the carrier signal. More particularly, the high unmodulated signal sets the operating value of the amplifier which may not allow for the amplification of the low modulated signal having a need for amplification. Second, and even more important, the average optical power must be kept below approximately 5 milliwatts (mW) to avoid signal reduction, distortion and damage to the photodetector that commonly receives the output of the electro-optical modulator. This 5 mW limitation does not take advantage of the existing optical signal generator having average optical power outputs approaching 100 to 200 mW levels.

Accordingly, it is desired that an apparatus and a method of operation thereof be provided to reduce the unmodulated carrier power so that amplifiers can be efficiently used and so that optical carrier generators having relatively high output power levels may be detected by a photodetector without any operation degradation of the photodetector or without any damage to the photodetector. If such an apparatus and method are provided then optical amplifiers may be more efficiently utilized and a corresponding reduction in the fiber-optical link loss may be realized. Furthermore, the provided apparatus and method may be utilized in conjunction with other optical systems that utilize linear carrier filtering techniques so as to make additional improvements in the fiber-optic link efficiency. If such an apparatus and method of operation thereof are provided the sensitivity and efficiency of the overall fiber-optical link or its related system may be improved.

OBJECTS OF THE INVENTION

Accordingly, a principal object of the present invention is to provide both an apparatus and a method for increasing the sensitivity and efficiency of the fiber-optical transmission and processing systems.

Another object of the present invention is to reduce the level of the output power of an electro-optical modulator forming part of the fiber-optical system so that the output power signal does not distort or reduce the output of the photodetector receiving the optical modulated signal, nor does the output power signal damage such a photodetector.

It is a further object of the present invention to provide for optical carrier wave sources having outputs in excess of 5 milliwatts, yet allow high speed photodetectors to receive and respond to signals of about 1 to 5 milliwatts (mW) so as to avoid catastrophic damage to the photodetector receiving a modulated signal, while at the same time providing for a linear response of the photodetector.

Further, it is an object of the present invention to provide for an apparatus and a method of modulating optical signals, such as those developed by lasers and allow for a very broadband response of such modulators in forms of tens of megahertz to tens of gigahertz, so that the practice of the present invention may easily find application in wideband systems using optical transmission and receiving techniques.

SUMMARY OF THE INVENTION

The present invention is directed to optical systems utilizing a Brillouin medium that has a fixed operation at a definite power level so that signals, such as optical carrier waves, above this level are attenuated, while signals below this level, such as those contained in the sidebands of the optical carrier waves, are allowed to pass.

The present invention provides an attenuator and filter for reducing, passing, and blocking incident optical signals comprising carrier waves having sidebands each having a preselected power level. The attenuator and filter comprise a Brillouin medium having a threshold for creating backward traveling Stoke's waves when subjected to a predetermined power level of incident optical signals. The threshold is selected to increase the power ratio of the sidebands to their carrier wave.

BRIEF DESCRIPTION OF THE DRAWINGS

These and other objects, features and advantages of the invention, as well as the invention itself, will become better understood by reference to the following detailed description when considered in connection with the accompanying drawings, wherein like reference number designate identical or corresponding parts throughout the several views and wherein:

FIG. 1 is a block diagram of prior art arrangement having a photodetector at the output stage thereof responsive to optical signals.

FIG. 2 is a diagram illustrating the quadrature biasing and output parameter of the electro-optical modulator shown in FIG. 1.

FIG. 3 is a schematic of the components making up the output power signal of the electro-optical modulator of FIG. 1.

DETAILED DESCRIPTION OF THE PREFERRED EMBODIMENTS

Figure 4:
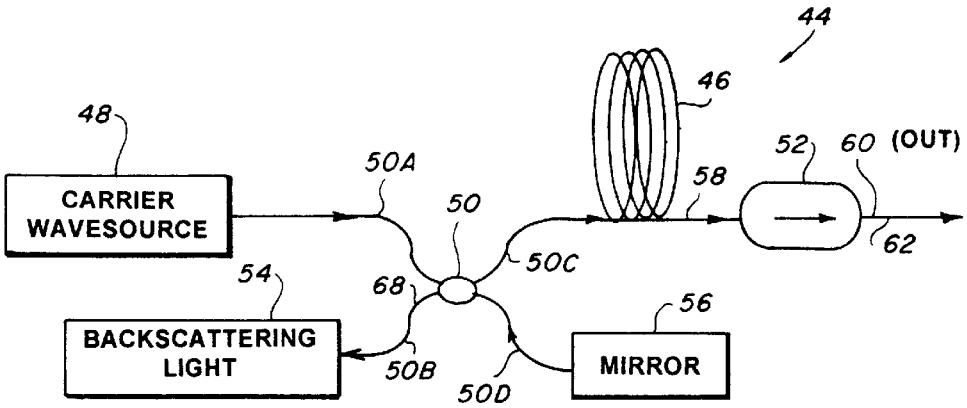
FIG. 4 is a block diagram illustrating the general principles related to a stimulated Brillouin scattering device utilized in the present invention.

In general, the present invention relates to the use of a Brillouin medium, as a filter and attenuator, that creates Stoke's waves when subjected to an optical carrier having sidebands, each with a predetermined power ratio. The Brillouin filter and attenuator has a threshold, commonly referred to as a stimulated Brillouin scattering (SBS) threshold, that fixes the operation thereof to a predetermined power level output so that selected signals are attenuated and selected signals are allowed to pass through the filter and attenuator without any attenuation thereto. The principles of the present invention may be better appreciated by first referring to a prior art arrangement 10 illustrating in FIG. 1.

The prior art arrangement 10 comprises a carrier wave (CW) source 12, and electro-optical modulator 14, an optical fiber 16, and a photodetector (PD) 18. The CW source 12 may have a power output of about five to twenty milliwatts (mW) which is relatively low considering that presently existing laser sources may have power levels approaching 200 mW which cannot be used, in a manner to be described, for the arrangement 10 having the photodetector 18. The carrier wave (CW) source 12 generates an output signal indicated in FIG. 1 as $P_{in}$ and applied on signal path 20 that is routed to the electro-optical modulator 14.

The electro-optical modulator 14 may be a Mach-Zehnder modulator which depends sinusoidally on an input electrical signal, such as signal 22 ($V_{\pi}$Input), that is applied to signal path 24 which, in turn, is routed to the electro-optical modulator 14. The electro-optical modulator 14 modulates the carrier wave with the information contained in signal 22, thereby, allowing the carrier wave having sidebands to serve as a vehicle for optically transmitting the information contained in signal 22. The electro-optical modulator 14 generates an output signal, indicated in FIG. 1 as $P_{out}$, that is applied to signal path 26 which is routed to the fiber optic 16 which, in turn, applies an output signal on signal path 28 that is routed to the photodetector (PD) 18 which, in turn, provides an output signal 30 (OUT) on signal path 32. The carrier wave (CW) source 12, the electro-optical modulator 14, fiber optic 16 and photodetector 18 all operate in a manner known in the art.

As previously discussed in the "Background" section, a photodetector, such as the photodetector 18, is typically a high-speed device that cannot receive a signal at its input stage carrying more than about 1 to 5 mW of optical power before nonlinearities, bandwidth reduction, or catastrophic damage occurs to the operation of photodetector 18, or the photodetector 18 itself. Therefore, the presently available high-power (approximately 200 mW) laser sources serving as a carrier wave (CW) source, such as source 12, cannot be utilized by the circuit arrangement 10. In addition to carrier wave (CW) source 12 limitations, the usage of the electro-optical modulator 14 of FIG. 1 has limitations with regard to its linearity of operation which may be described with reference to FIG. 2.

FIG. 2 has a Y axis, indicated as the optical through put of the electro-optical modulator 14, and a X axis indicated as being the sinusoidal input signal 22 ($V_{\pi}$(Input Voltage)). For linearity operation of the electro-optical modulator 14 and for maximum differential change in the optical output signal of the electro-optical modulator 14 per input volt of the input signal 22, the electro-optical modulator 14 is typically biased at a point 34 corresponding to one-half of the maximum output signal 36. The bias point 34 is called quadrature and is typically accomplished by applying a bias voltage to the electro-optical modulator 14 in a manner known in the art. When biased at quadrature (34), the electro-optical modulator 14 optical output signal $P_{out}$ may be given by the below expression 1:

$$P_{out} = \frac{P_{in}}{2}\,[1 \pm \sin(kx)] \tag{1}$$

where $P_{in}$ is the input optical power generated by the CW source 12 and applied to signal path 20 of FIG. 1, k is a constant, x is the input signal voltage (signal 22) applied to the electro-optical modulator 14 on signal path 24, and the sign (±) of expression (1) depends on the slope of the quadrature point 34 chosen in a manner known in the art. The sinusoidal function of the input signal 22 introduces compression in the output signal $P_{out}$, unless the modulator depth, m, that is, the degree to which the carrier wave from the CW source 12 is modulated by the input signal 22, is kept below about 71%. The modulation depth, m, may be defined by expression 2:

$$m = \frac{P_{max} - P_{min}}{P_{max} + P_{min}} \tag{2}$$

when kx is small the output signal ($P_{out}$) may be approximated by expression 3:

$$P_{out} = \frac{P_{in}}{2}\,[1 + kx] \tag{3}$$

where the positive sign of expression (3) is taken without loss in generality or approximation. Under such as assumption, expression (3) may be rewritten as the below expression 4 which is also generally illustrated in FIG. 3.

$$P_{out} = P_{excess} + \frac{P_{mod}}{2}\,[kx_{average} + kx] \tag{4}$$

FIG. 3 illustrates as its Y axis the $P_{out}$ signal from the electro-optical modulator 14, as well as illustrates the first component of the right hand side of expression (4) identified by reference number 38, the second component of the right hand side of expression (4) identified by reference number 40, and a band of the component 40 identified by reference number 42. The band 42 of component 40 contains the maximum peaks and valleys of the output signal $P_{out}$, i.e. the portion of the optical carrier 20 modulated by RF signal 24, in electro-optic modulator such as member. Horizontal lines 42 bracket the maximum and minimum extent of the modulated RF signal onto the carrier, and is the depth of modulation. Line 38 extends up to the minimum of the modulation (bottom line of lines 42), and represents the unmodulated carrier, or excess carrier.

Component 40 is the portion of the curve in FIG. 3 disposed between horizontal lines 42, and is the sum of the signal kx, which may be positive or negative, and is typically just enough of an input optical carrier $kx_{average}$ to insure that the modulation depth of the component 40 does not exceed 100%. The component 38 identified as $P_{excess}$ is commonly called the "excess carrier" and represents the undesired unmodulated optical power previously described in the "Background" section having undesired aspects. If this excessive carrier, that is, component 38 is considered to be a separate optical component, as expression (4) suggests, the excessive carrier increases the signal that the photodetector 18 is subjected to since the photodetector 18 acts like a coherent high-power local oscillator to further increase the power level of the excessive carrier. However, the output of the photodetector 18 and its "gain" is linearly proportional to the excess carrier power (component 38) which is limited by the photodetector 18 power handling capabilities, that is in the range of 1 to 5 mW. The limitation to the photodetector 18, as well as the inability to effectively utilize the excess carrier component 38, in addition to the incapability of utilizing the existing CW sources 12 having a laser output of approximately 200 mW, increase the fiber-optic link losses that a system employing the circuit arrangement of FIG. 1 may experience.

The input electrical power, such as signal 22 of FIG. 1, can be expressed by expression 5 given below:

$$P_{\mu W,in} = \frac{V^2_{in\ peak-peak}}{2R_{in}} \tag{5}$$

where $R_{IN}$ is the input resistance, and $V_{in\ peak\text{-}peak}$ is the peak-to-peak input voltage. The output power from the photodetector 18, that is, signal 30 (OUT) of FIG. 1 may be calculated from the peak modulation current, $m.I_{PD,aver}$, and may be expressed by expression 6 given below:

$$P_{\mu W,out} = \frac{m^2 I^2_{PD,aver} R_{LOAD}}{2} \tag{6}$$

where $R_{LOAD}$ is the load resistance. The fiber-optic link loss is the ratio of the output power to the input power and may be expressed by expression 7 given below:

$$\frac{P_{\mu W,out}}{P_{\mu W,in}} = \frac{m^2 I^2_{PD,aver} R_{LOAD} R_{IN}}{V^2_{in}\text{peak} - \text{peak}} \tag{7}$$

which reduces to 200 $I^2_{PD}$, aver. with typical values of $R_{LOAD}=R_{IN}=50\Omega$ and with a modulator $V_\pi$ of 10 volts (at $V_{in}=V_\pi/4$, m=0.71).

Expression (7) indicates that the fiber-optic link loss transmission coefficient is proportional to the photodetector 18 average current squared. For high-speed photodetectors 18 with an average current limited to 1 mA, conventionally the minimum fiber-optic link loss is approximately 37 dB. So very little output microwave power from photodetector 18 is available from signals with small modulation depths. This also results in very little optical power in the modulation sidebands on the optical carrier wave. If a photodetector 18 was available which could detect 70 mA without damage or responsivity reduction, the fiber optic link loss would decrease to 0 dB, resulting in more output power from photodetector 18. However, they do not exist yet at microwave frequencies. Therefore, if a technique was available to attenuate the optical carrier wave to create 1 mA photodetector currents and not attenuate the modulation sidebands, more signal power would be available from photodetector 18.

Fiber-optic link loss may also be further considered from a modulation depth m, analysis. For example, consider an optical signal of 100 $\mu$W (−10 dBm average optical power output from the electro-optical modulator 14, where dBm is absolute power measured in decibels, and referenced to 1 mW). Consider further that this optical signal contains sinusoidal optimal optical modulation with a 100% modulation depth, m. If the average power yielded by electro-optical modulator 14 is increased by a factor of N=10 to 1 mW (0 dBm) by amplification at the output stage of the electro-modulator 14, the output signal of the optical-modulator 14 detected by the photodetector 18 would be increased by G=100 (20 dBe). That is, assuming a photodetector 18 has a responsivity of 1 A/W and a 50Ω load, the original (no amplification) post-detection electrical power of −36 dBm would be increased to −16 dBm. However, if an optical signal of 100 $\mu$W (−10 dBm average optical power output from the electro-optical modulator 14) containing sinusoidal optical modulation of only 1% modulation depth was similarly amplified, the corresponding original (no amplification) post-detection electrical power of −76 dBm would be increased to −56 dBm. The reduced modulation depth, m, of 1% instead of 100% has reduced the output power of the electro-optical modulator 14 by 40 dB. Thus, for these assumptions, a 40 dB improvement in the fiber-optical link loss could be realized if the modulation depth, m, could be increased to its optimum value of 100%. The present invention provides for an apparatus and a method both that increase the modulation depth, m, to keep the fiber-optic link loss to a relatively small amount, and, in fact, the output of the electro-optical modulator 14, or a similar device, after being conditioned by the present invention, that is applied to the photodetector 18 can be reduced to a point that the overall insertion loss of the fiber-optical link may be eliminated altogether, thereby, decreasing the fiber-optic link loss of the system embodying the present invention. The present invention may be first described with reference to FIG. 4.

FIG. 4 illustrates an arrangement 44 having a Brillouin medium 46, known in the art and is further described, for example, in the text "The Principles of Nonlinear Optics," of Y. R. Shen published by John Wiley and Sons, New York, 1984 and, also in the text "Quantum Electronics," of A. Yariv published by John Wiley and Sons, New York, 1989, both of which are herein incorporated by reference. The Brillouin medium 46 acts as an attenuator and filter for reducing, passing and blocking incident optical signals comprising carrier waves having sidebands each having a preselected power level. The Brillouin medium 46 has a threshold for creating backward traveling Stoke's waves when being subjected to a predetermined power level of incident optical signals. As will be further described, the threshold of the Brillouin medium 46 is selected to increase the sideband to carrier wave power ratio so as to increase the modulation depth, m, of the systems in which the Brillouin medium 46 is used, such as wideband filter-optic systems.

Figure 5:
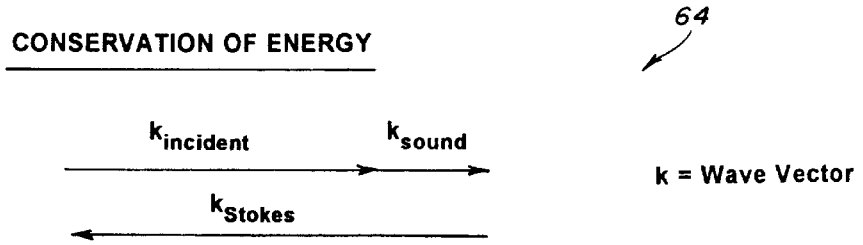
FIG. 5 illustrates a schematic related to the generation of the Stoke's waves of the Brillouin device generally illustrated in FIG. 4.

The circuit arrangement 44, in addition to the Brillouin medium 46, comprises a carrier wave source 48, a fiber-optic coupler 50 having four signal paths or ports 50A, 50B, 50C, and 50D, a 50 dB isolator 52, back scattering light 54 generated by the operation of the Brillouin medium 46, and a mirror 56 used in the generation of the electrical signal from the back scattering light 54 in cooperation with the Brillouin medium 46. The carrier wave source 48 generates the optical carrier that is applied to the fiber-optic coupler 50, via signal path 50A. The fiber-optic coupler 50 transfers the carrier wave signal to its output path 50C that is applied to the Brillouin medium 46. The Brillouin medium 46 generates an output signal that is applied to the 50 dB isolator 52, via signal path 58 which, in turn, develops an output signal 60 (OUT) on signal path 62. The signal path 50C is bidirectional because the Brillouin medium 46 creates backward traveling Stoke's waves that are directed back into the fiber-optic coupler 50. The general operation of the Brillouin medium 46 may be further described with reference to FIG. 5 having a schematic 64 comprised of directional arrows or wave vectors, $k_{incident}$, $k_{sound}$ and $k_{Stoke's}$. The relationship of these wave vectors may be given in the below expression 8 where k is a wave vector:

$$k_{incident}+k_{sound}=k_{Stokes} \quad (8)$$

The Brillouin medium 46 upon being subjected to an optical signal ($k_{incident}$) of moderate to high power (to be described) generates sound wave $k_{sound}$. As the power in the optical signal $k_{incident}$ increases the optical wave $k_{incident}$ interacts with the sound wave $k_{sound}$ in the Brillouin medium 46. This interaction causes the incident light $k_{incident}$ to be scattered in accordance to the conservation of energy, sometimes referred to as conservation of momentum, thereby, downshifting, that is, decreasing, the frequency of the scattered signals. From expression (8) it should be seen that incident and sound wave vectors are additive to each other to form the Stoke's wave vector. The presence of the Stoke's wave ($k_{Stoke's}$) regenerates the sound wave ($k_{Sound}$) and results in positive feedback so as to result in a threshold effect, whereby above a given power of the incident signal ($k_{incident}$) the Stoke's waves grow without bounds. The Stoke's wave output is limited solely by the depletion of the pump, that is, the input signal, such as that supplied from a carrier wave (CW) source 48, having a single-frequency 1550-nm Erbium laser with a linewidth less than 100 kHz.

The Brillouin medium 46 of FIG. 4 may comprise a 25 km length of dispersion shifted single mode optical fiber having a predetermined stimulated Brillouin scattering (SBS) bandwidth. The SBS bandwidth and a typical input-output-scattered power representation process related to the Brillouin medium 46 may be further described with reference to FIG. 6.

Figure 6:
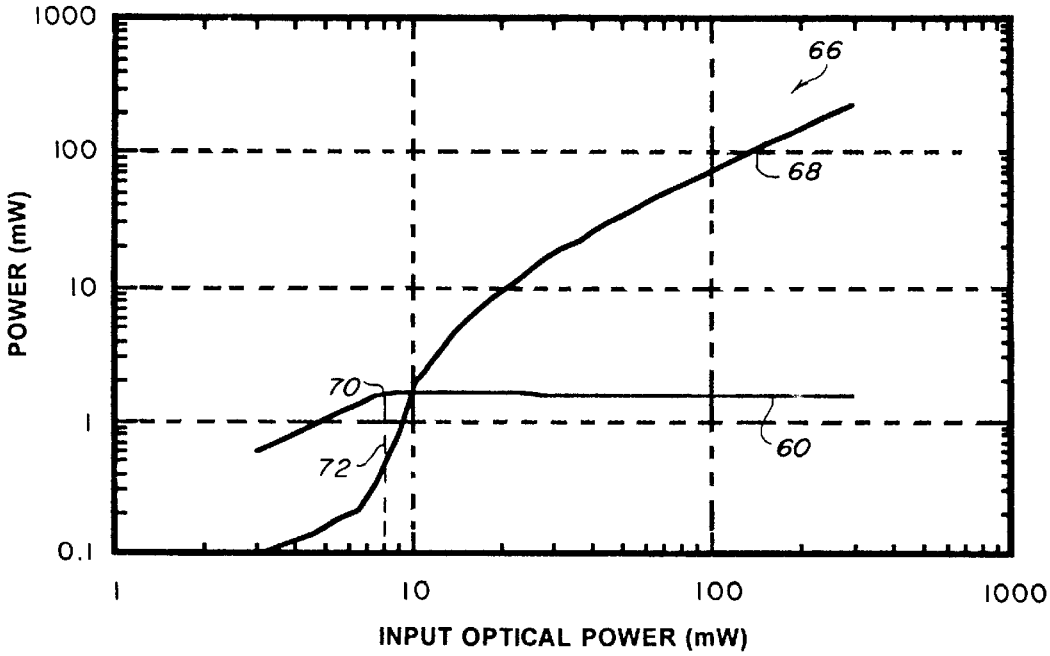
FIG. 6 illustrates the response of the Brillouin device of FIG. 4.

FIG. 6 has an X axis indicating the input optical power in milliwatts (mW), and a Y axis indicating the power output of the Brillouin medium 46 given in milliwatts (mW) . The overall operation of the Brillouin medium 46 is indicated by response 66 which comprises two plots 68 and 70 that are respectively representative of the backward traveling power (Stoke's) present on signal path 50C of FIG. 4, and the forward traveling power (output) that is present on the signal path 62 of FIG. 4 and corresponds to signal 60 (OUT) of FIG. 4.

FIG. 6 further illustrates a point 70 corresponding to a typical SBS threshold having a typical value of 8 mW, as identified by vertical dimensional line 72. As seen in FIG. 6, the input optical power corresponding to the SBS threshold, that is, 8 mW represents the point 70 that the Stoke's backward traveling (power plot 68) increases rapidly (this actually defines the SBS threshold). The SBS threshold also indicates the point 70 that the transmitted power, that is, plot 60, is effectively clamped. Incident light, that is, the output of the CW source 48 reaching the Brillouin medium 46 as incident light, $k_{incident}$, above the SBS threshold (8 mW) and within the SBS bandwidth, is scattered backwards. More particularly, incident light above the SBS threshold does not get past the Brillouin medium 46, but rather is directed backward to the fiber-optic coupler 50, via signal path 50C.

The SBS bandwidth is measured by measuring the bandwidth of the scattered light (see backscattering light 54 of FIG. 4). The measuring is accomplished by heterodyning the Stoke's wave, which is developed by the interaction of the sound wave ($k_{sound}$) of the Brillouin medium 46 with the incident wave ($k_{incident}$) generated by the carrier wave source 48, with additional light waves from a mirror 56 that may be developed by a high speed photodetector and applied to the fiber-optic coupler 50, via signal path 50D. The heterodyning results in a beatnote frequency centered around the difference frequency between the Stoke's wave and the input signal, for example, the signal supplied by the carrier wave source 48. The beatnote frequency is dependent upon the Brillouin medium 46, and for the Brillouin medium 46 comprised of fused silica, the beatnote frequency is between 10 and 12 GHz. More particularly, for the fused silica Brillouin medium 46 of FIG. 4 having a length of 25 km, the beatnote frequency is 10.54 GHz and is shown in FIG. 7.

Figure 7:
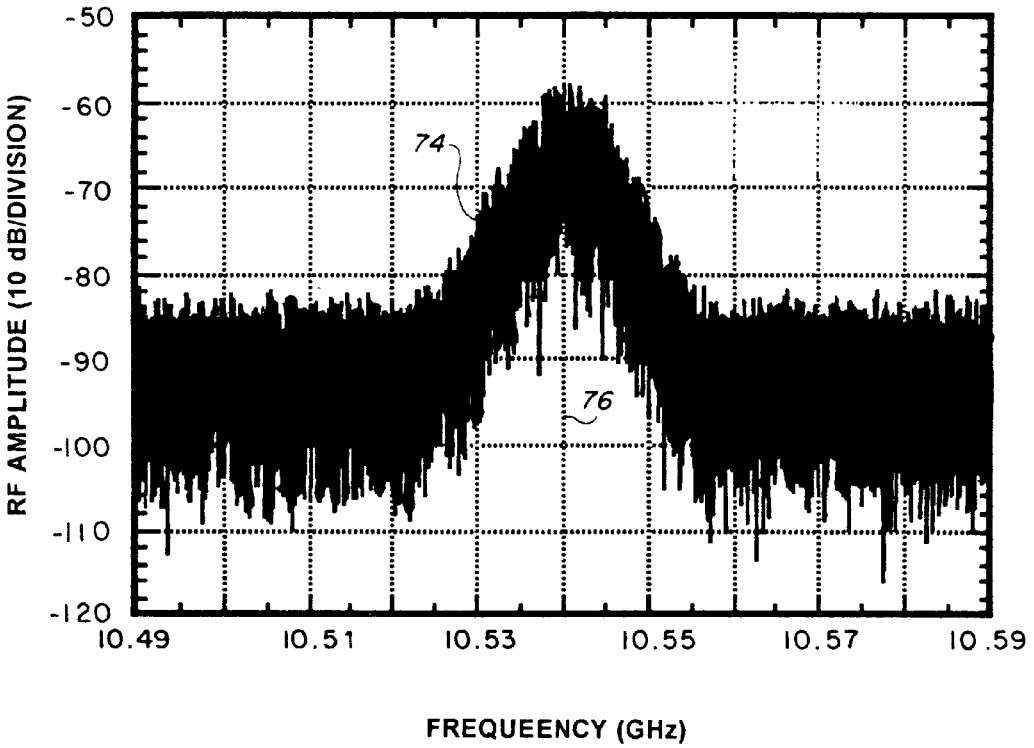
FIG. 7 illustrates the response of the circuit arrangement of FIG. 4.

FIG. 7 shows a resulting beatnote frequency signal or heterodyne signal 74 where it is seen that the Stoke's shift for the Brillouin medium 46 is at the center point 76 corresponding to the frequency of 10.54 GHz. The 3 dB bandwidth of the signal 74 developed by the circuit arrangement of FIG. 4 is less than 10 MHz. The stimulated Brillouin scattering provided by the Brillouin medium 46 may also be provided by a fiber-optic ring resonator (FORR) which may be described with reference to FIG. 8.

Figure 8:
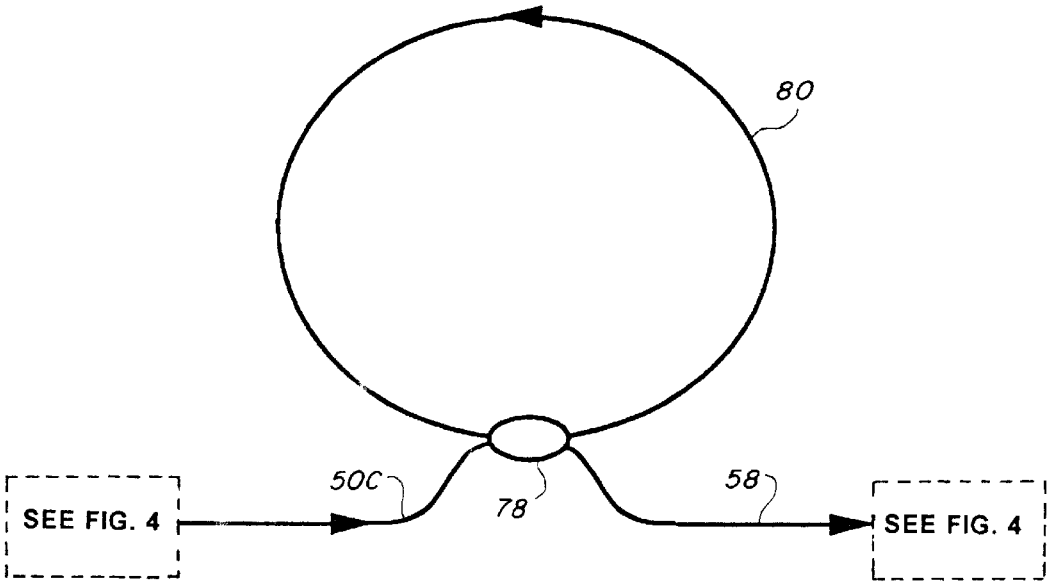
FIG. 8 illustrates an alternate embodiment for generating the Stoke's waves of FIG. 5.

FIG. 8 illustrates the fiber-optic ring resonator (FORR) comprising a fiber-optic coupler 78 having a low coupling ratio. The fiber-optic ring resonator (FORR) 78 recirculates light, indicated by directional arrow 80, in a manner known in the art. The FORR device 78 has many useful applications, also known in the art, and is more fully described in the technical article "Filter Response of Single-Mode Fiber Recirculating Delay Lines," of J. E. Bowers, S. A. Newton, V. M. Sorin, and H. J. Shaw, published in the *Electronic Letters* 18, pp. 110–112, 1982, and herein incorporated by reference. The FORR device 78 operates in a similar manner to that of the Brillouin medium 46 of FIG. 4, but has a lower SBS threshold which could be as low as 100 $\mu$W. Resonant cavity loop 80 is of Brillouin material, and as light circulates in the loop the buildup of energy in the cavity will cause Brillouin scattering to occur at lower input power than would occur were no energy stored in the Brillouin material (e.g., as in embodiments described above). Because of this, one would wish the Q of loop cavity 80 to be as high as possible to maximize energy stored in the loop per unit of input energy to the loop, so as to make the fiber reach its Brillouin threshold at as low an input power as possible, maximizing filter sensitivity. Stated alternatively, the FORR device 78 doesn't require the same relatively long length, e.g., 25 km, as that of the Brillouin medium 46 of FIG. 4, to produce the same amount of signal filtering.

It should now be appreciated that the practice of the present invention provides for various devices such as the Brillouin medium 46 of FIG. 4 or the FORR device 78 of FIG. 8, both of which act as a filter to reject a particular band of signals having a particular level of power. Each of these devices 46 and 78 has a very narrow bandwidth, such as the 10 MHz bandwidth of FIG. 7 for the Brillouin medium 46, and effectively clamp the input power of the incident light, that is, the power of the signal supplied by the CW source 48 so that light sources producing incident light having a power rating approaching 200 mW may be utilized by the practice of the present invention without causing any detrimental effects to a conventional high speed photodetector. One application of the present invention may be described with reference to FIG. 9.

Figure 9:
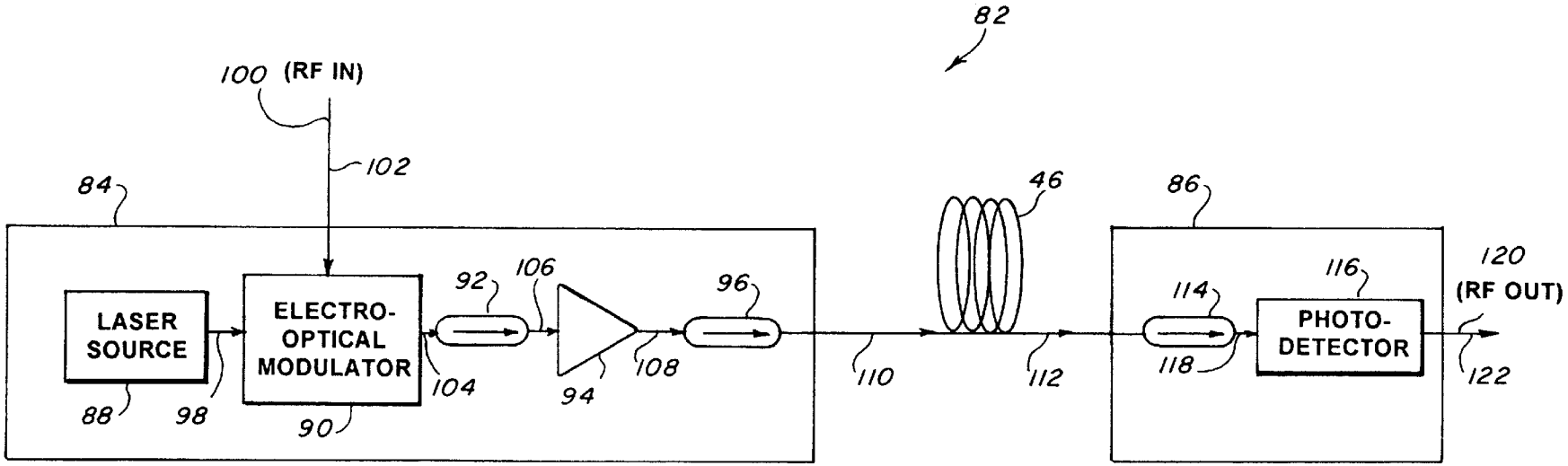
FIG. 9 illustrates a block diagram of a system utilizing the practice of the present invention.

FIG. 9 illustrates an arrangement 82, wherein the Brillouin medium 46 of FIG. 4 is interposed between an optical transmitter 84 and an optical receiver 86. The optical transmitter 84 comprises a laser source 88, an electro-optical modulator 90, a fiber-optic isolator 92, an amplifier 94 (340 mW) that may comprise an Erbium-doped fiber amplifier, and a fiber-optic isolator 96. The laser source 88 may be a single-frequency 1550-nm Erbium laser with a linewidth less than 100 kHz and with a power output of about 50 mW and may be of a type made available by ATX Telecom as their model 1535-EHA. The laser source 88 provides a forward-traveling carrier wave that is applied to the electro-optical modulator 90 via signal path 98. The electro-optical modulator 90 may be a Mach-Zehnder modulator, known in the art, that receives an RF signal ($RF_{IN}$) 100 via signal path 102. The signal 100 (RF) that modulates the forward-traveling carrier wave from the source 88 may have a typical amplitude of 14 volts at a frequency of about 18 GHz. The electro-optical modulator 90 modulates the carrier wave generated by the laser source 88 with the signal 100 ($RF_{IN}$) and provides an output on signal path 104 that is routed to the fiber optic isolator 92 which, in turn, provides an output on signal path 106 that is routed to the amplifier 94. The amplifier 94 amplifies and isolates its received signal and generates an output signal on signal path 108 that is applied to the optical fiber isolator 96 which, in turn, provides an output signal comprised of the carrier wave of laser source 88 modulated by the information contained in the signal 100 ($RF_{IN}$) and having sidebands. The fiber-optic isolator 96 delivers its output on signal path 110 that is routed to the Brillouin medium 46 which, in turn, provides an output signal that is applied to the optical fiber isolator 114 of the optical receiver 86, via signal path 112. The optical fiber isolator 114 applies its received signal to a photodetector 116, via signal path 118. The photodetector 116 develops an output signal 120 ($RF_{OUT}$) that is applied to signal path 122.

In general, the method of operation for the arrangement of FIG. 9 is to provide a Brillouin medium having a threshold for creating backward traveling Stoke's waves when subjected to a predetermined power level of incident optical signals. Further, the method of operation for the arrangement of FIG. 9 includes selecting the threshold at a power level so that optical carriers above this threshold are attenuated and sidebands of the optical carriers are allowed to pass. The selected threshold establishes a depth of modulation of the information 100 ($RF_{IN}$) that is carried by the optical signals generated by the laser source 88.

In operation, as the optical transmitted power increases, that is the power on signal path 110, the Brillouin medium 46 operates, in a manner as described with reference to FIGS. 4–8, so as to scatter all optical signals (into their respective Stoke's waves) which are defined by a power level above the SBS threshold of the Brillouin medium 46. The Brillouin medium 46 scatters signals that have a power level greater than, for example, 8 mW and for the laser source 88 this power level corresponds to carrier wave signals having a frequency within 25 MHz of the carrier wave. Therefore, if the modulation sidebands, contained on the carrier wave applied to the Brillouin medium 46 are greater than 25 MHz of the incident signal (the signal developed by laser source 88) and if the sidebands do not contain sufficient power (8 mW) to activate the (SBS) threshold for the Brillouin medium 46 described with reference to FIG. 6, the sidebands are transmitted without loss of power. That is to say that if the sidebands of the input signal are spaced from the unmodulated optical carrier by more than the Brillouin linewidth, and the carrier contains more power than the sidebands, and sufficient power to drive the Brillouin material into stimulated scattering, the carrier will trigger stimulated Brillouin scattering at its frequency, and at all frequencies within the Brillouin linewidth. If the sidebands do not contain sufficient power to drive the Brillouin medium into stimulated scattering, the sidebands do not experience stimulated Brillouin scattering and pass without added attenuation, thus increasing system sensitivity. The sidebands and the information they contain are allowed to pass the Brillouin medium 46 without any attenuation thereto and are directed to the optical receiver 86, in particular, the photodetector 116. Furthermore, since the carrier power, that is, the output power of the laser source 88 having a typical value of 50 mW, is above the SBS threshold (8 mW) , the transmitted carrier power, that is, the power made available on signal path 112, is clamped to the 8 mW quantity (SBS threshold) . The net effect is to increase the received sideband to carrier wave power ratio, thereby increasing the modulation depth, m, and also decreasing the fiber-optic link loss of the optical system embodying the practice of this invention, such as circuit arrangement 82 of FIG. 9.

The circuit arrangement 82 is advantageous in that it is self-regulating because no stabling bias control is required. Further, the circuit arrangement 82 is advantageous in that it is self-tuning because the threshold of the Brillouin medium 46 is at the carrier wavelength, provided the linewidth of the laser source 88 is less than the SBS threshold bandwidth. The operation of the SBS threshold to reduce the carrier wave is immune to laser (carrier) drift, provided the drift rate is slower than the order of the SBS threshold bandwidth divided by the propagation delay, e.g., for FIG. 9, 8 MHz/(25km • 5 $\mu$s/km)=64 MHz. The operation of the circuit arrangement 82 of FIG. 9 was experimentally verified and the results of which are shown in FIG. 10.

Figure 10:
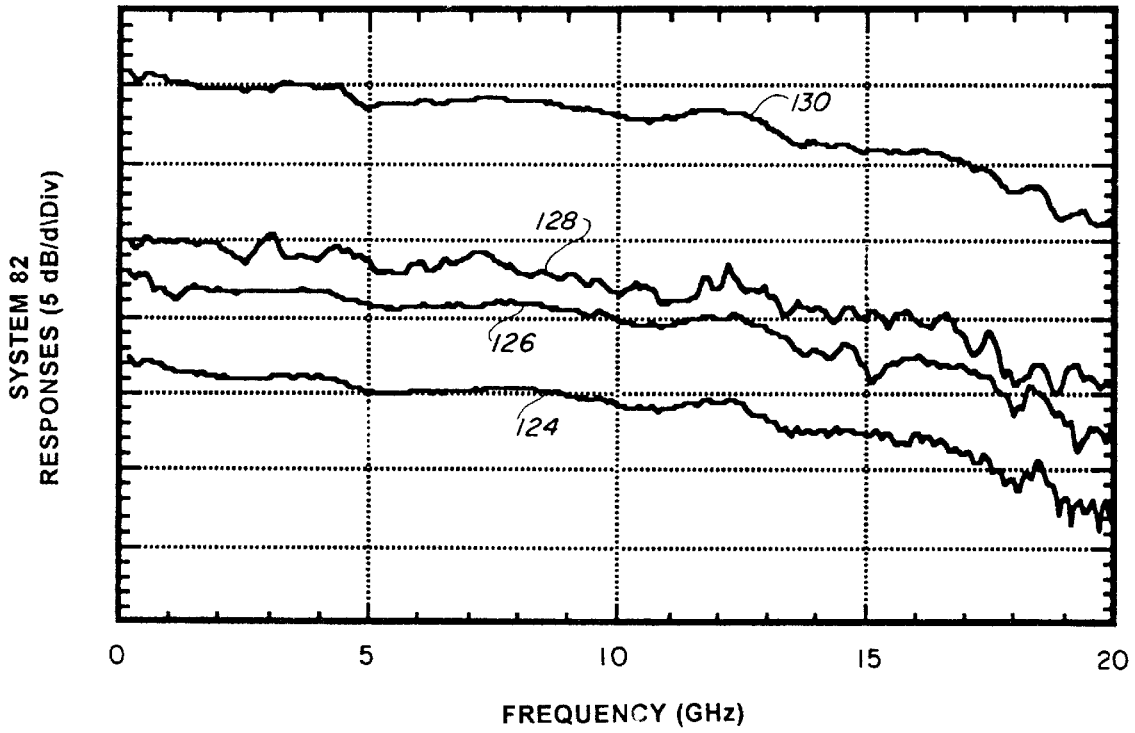
FIG. 10 illustrates various responses of the system of FIG. 9 to corresponding stimulation.

FIG. 10 illustrates the system 82 responses represented by plots 124, 126, 128, and 130 each indicative of particular operational parameters selected for the system 82 and given in Table 1.

TABLE 1

| PLOT | SYSTEM OPERATION |
|---|---|
| 124 | JUST BELOW AN SBS THRESHOLD (8 mW INPUT) |
| 126 | FOUR (32 mW) TIMES THE SBS THRESHOLD POWER |
| 128 | EIGHT (64 mW) TIMES THE SBS THRESHOLD POWER |
| 130 | EIGHT (64 mW) TIMES THE SBS THRESHOLD AND WITH THE ELECTRO-OPTICAL MODULATOR 90 BIAS BELOW QUADRATURE VIA THE TRANSMISSION OF APPROXIMATELY 5% |

Table 1 indicates the set of conditions that the Brillouin medium 46 is subject to at its input stage. For example, plot 124 (response shown in FIG. 10) illustrates the response of system 82 when the Brillouin medium 46 is subjected to incident optical signals having a power level of just below the SBS threshold of 8 mW.

The plots 126 and 128 respectively represent gains of 6 and 8 dB, whereas plot 130 represents an effective gain of 19 dB, as well as a state of operation, and wherein each gain corresponds to the gain in the ratio of sideband power relative to the carrier wave power.All the plots 124, 126, 128 and 130 represent system responses for the circuit arrangement 82 in which the photodetector 116 of FIG. 8 has the same operating current because the transmitted output, that is, the power made available at signal path 112 is clamped by the operation of the Brillouin medium 46 in a manner as previously described with reference to FIG. 6. Further, all of the plots 124, 126, 128 and 130 have a gain factor for the sideband to carrier wave power ratio increases whose response is very broad, such as that between 45 MHz to 20 GHz. The plots 124, 126, 128 and 130 could be duplicated by the use of the FORR device 78 of FIG. 8 with even still further possible increases in gain factors.

It should now be appreciated that the practice of the present invention provides for a stimulated Brillouin scattering effect produced by Brillouin medium that acts as an attenuator and filter passing and rejecting selected frequencies, while clamping or fixing the power output of the Brillouin medium.The selection of the Brillouin medium allows for the increase of the sideband to carrier wave power ratio which, in turn, increases the depth of modulation, m, experienced by the information carried by the optical carrier wave.

Further, the practice of the present invention effectively clamps the output power of an optical transmitter so as to provide protection against photodetector catastrophic failures or operation degradations of the photodetector. Furthermore, the practice of the present invention provides for an arrangement that is inherently self-tuning in that the Brillouin medium serving as the filter is always centered on the carrier wavelength having parameters that correspond to the SBS threshold. This centering is maintained so long as the wavelength of the carrier wave does not drift rapidly.

Furthermore, the present invention allows for the use of microwave power from microwave optical carrier wave sources having an output power level approaching 200 mW.However, if desired, a FORR device 78 may be utilized and still provide for a SBS power threshold of a relatively low value so that the practice of the present invention may be utilized for optical carrier wave sources having a power rating of 1–5 mW.

Although the hereinbefore given description is related to a Brillouin medium comprised of silica or the FORR device both having the stimulated Brillouin scattering effect, other Brillouin mediums, known in the art, may be used to accomplish the same stimulated Brillouin scattering effect.

It should, therefore, readily be understood that many modifications and variations of the present invention are possible within the purview of the claimed invention.It is therefore to be understood that, within the scope of the appended claims, the invention may be practiced otherwise than as specifically described.

What I claim is:

1. An attenuator and filter for reducing, passing and blocking incident optical signals comprising carrier waves having sidebands each having a preselected power level, said attenuator and filter comprising a Brillouin medium having a threshold for creating backward traveling Stoke's waves when subjected to a predetermined power level of incident optical signal, said threshold being selected to increase the sideband to carrier wave power ratio.

2. The attenuator and filter according to claim 1, wherein said predetermined power level is in excess of about 5 milliwatts (mW).

3. The attenuator and filter according to claim 1, wherein said incident optical signal is generated by a laser source having an operating wavelength of about 1550 nm with a linewidth less than about 100 kHz.

4. The attenuator and filter according to claim 3, wherein said Brillouin medium is a dispersion shifted single mode optical fiber comprised of fused silica and has a length of about 25 km.

5. The attenuator and filter according to claim 3, wherein said Brillouin medium is a fiber-optic ring resonator.

6. A method of increasing the power ratio of sidebands to their incident optical carrier waves comprising the steps of:

(a) providing a Brillouin medium having a threshold for creating backward traveling Stoke's waves when subjected to a predetermined power level of incident optical signals; and (b) selecting said threshold at a power level so that optical carrier signals above this threshold are attenuated and the sidebands of said optical carrier waves are allowed to pass.

7. The method of claim 6, wherein said selecting step further comprising selecting the threshold to establish a depth of modulation of the information carried by said incident optical signals.

8. The method of claim 6, wherein said predetermined power level has a value greater than about 5 milliwatts (mW) but less than 50 milliwatts (mW).

9. The method of claim 6, wherein said predetermined power level has a value of about 10 milliwatts.

10. The method according to claim 6, wherein said Brillouin medium is a dispersion shifted single mode optical fiber comprised of fused silica and having a length of about 25 km.

11. The method according to claim 6, wherein said Brillouin medium is a fiber-optic ring resonator.

12. An attenuator and filtering system for reducing, passing and blocking optical signals generated by an optical transmitter and received by an optical receiver, said optical transmitter having a source providing optical carrier waves in excess of about 5 milliwatts (mW) with sidebands thereof and an electro-optical modulator, said optical receiver having a photodetector responsive to received optical carrier waves and said sidebands thereof, said attenuator and filtering system being interposed between said optical transmitter and said optical receiver and comprising a Brillouin medium having a threshold for creating backward traveling Stoke's waves when subjected to a predetermined power level in excess of about 5 milliwatts (mW), said threshold being selected to establish a predetermined ratio of said sidebands and said carrier waves.

13. The attenuator and filtering system according to claim 12, wherein said threshold is further selected to determine the depth of modulation of the information carried by said carrier wave and said sidebands and received by said photodetector.

* * * * *